Michaels & Croskey.
Horse Power.

No. 90,182. Patented May 18, 1869.

Witnesses:

Inventors:
D. Michaels
J.H. Croskey
per Munn &c
Attorneys

United States Patent Office.

DENNIS MICHAELS AND JOHN H. CROSKEY, OF HOPEDALE, OHIO.

Letters Patent No. 90,182, dated May 18, 1869.

IMPROVEMENT IN HORSE-POWER.

The Schedule referred to in these Letters Patent and making part of the same.

*To all whom it may concern:*

Be it known that we, DENNIS MICHAELS and JOHN H. CROSKEY, of Hopedale, in the county of Harrison, and State of Ohio, have invented a new and improved Horse-Power; and we do hereby declare that the following is a full, clear, and exact description thereof, which will enable others skilled in the art to make and use the same, reference being had to the accompanying drawings, forming part of this specification.

This invention relates to improvements in horse-powers, having for its object to provide a power especially adapted to hoisting-purposes for elevating hay, freight, building-materials, &c., to save the loss of time required in backing up the animals, as now employed for hoisting, by drawing a rope through a tackle-block.

The invention consists in a rope-winding drum, actuated by a sweep, connected thereto by a latch, connection, which may be disengaged, and allow the rope to be unwound while the sweep stands still, all combined and arranged as hereinafter more fully described.

Similar letters of reference indicate corresponding parts.

Figure 1:
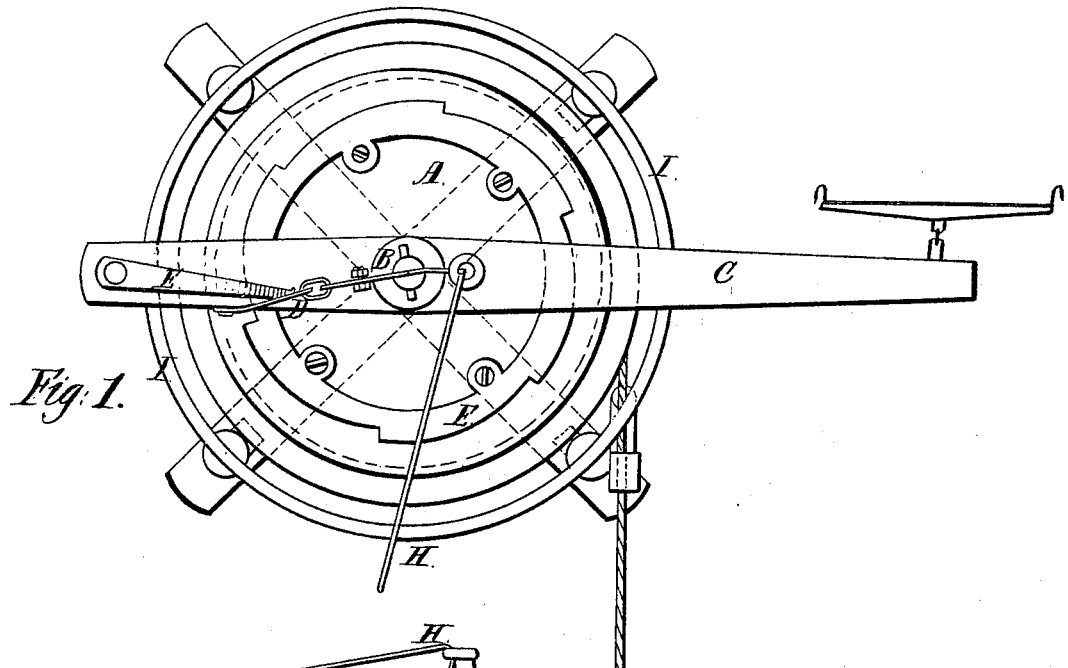
Figure 1 represents a plan view of our improved power.
Figure 2:
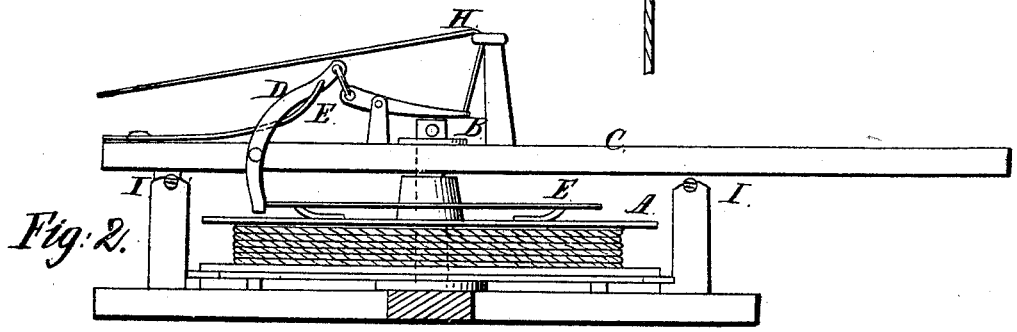
Figure 2 represents a side elevation of the same.

A represents a winding-drum, supported loosely upon a vertical shaft, B, having any preferred framing for its support.

C represents a sweep, also supported on the said shaft, and may be either loosely or rigidly connected thereto, as may be preferred, and is provided with a spring-latch, D, arranged to take into the notches of a notched ring, E, secured to the pulley.

The said catch is maintained in constant engagement with the notched ring by the spring E, and the pulley and sweep are thereby connected, so that the former will be operated to wind up the rope when the latter is moved by the animal.

When the rope has been wound up and the load discharged, the lever D may be disconnected from the notched ring, and the rope drawn down again, or it may be allowed to return by its weight, the drum freely rotating in the opposite direction independently of the sweep.

For convenience, in operating the latch, we connect with it a cord, H, working through an eye supported on the sweep.

By this arrangement the animal is required, besides going ahead, to stand only for the return of the rope, which is accomplished quickly.

For more permanence of the sweep, we provide the stay-ring I supported in suitable studs under the sweep, in a manner to brace it on each side of the axis for steadying it.

Having thus described our invention,

We claim as new, and desire to secure by Letters Patent—

The combination and arrangement of the drum A, mounted upon the shaft B in the framing, the notched ring E, sweep C, spring-latch D, cord H, and stay-ring I, as herein described, for the purpose specified.

DENNIS MICHAELS.
JOHN H. CROSKEY.

Witnesses:
DAVID ALLISON,
WILLIAM M. LIGGETT.